United States Patent
Chen et al.

(10) Patent No.: US 7,443,688 B2
(45) Date of Patent: Oct. 28, 2008

(54) COMPUTER ENCLOSURE (75) Inventors: Yun-Lung Chen, Tu-Cheng (TW);
Quan-Guang Du, Shenzhen (CN)

(73) Assignees: Hong Fu Jin Precision Industry (Shenzhen) Co., Ltd., Bao-an District, Shenzhen, Quangdong Province (CN);
Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 490 days.

(21) Appl. No.: 11/148,119

(22) Filed: Jun. 8, 2005

(65) Prior Publication Data
US 2006/0034046 A1  Feb. 16, 2006

(30) Foreign Application Priority Data
Aug. 10, 2004  (CN) .................. 2004 2 0082908 U (51) Int. Cl.
G06F 1/16 (2006.01)

(52) U.S. Cl. ..................... 361/726; 312/223.2

(58) Field of Classification Search ......... 361/679–683, 361/724–727; 312/223.1, 223.2, 332.1, 333; 70/286–288; 292/1, 256.75, 300–304
See application file for complete search history.

(56) References Cited

U.S. PATENT DOCUMENTS

| | | | | |
|---|---|---|---|---|
| 3,634,732 A * | 1/1972 | Finger et al. | ................. | 361/726 |
| 5,785,398 A * | 7/1998 | Park | ......................... | 312/223.2 |
| 6,134,116 A * | 10/2000 | Hoss et al. | ................... | 361/747 |
| 6,373,692 B1 * | 4/2002 | Cheng | ........................ | 361/683 |
| 6,480,398 B1 * | 11/2002 | Fiora et al. | .................. | 361/816 |
| 6,816,370 B2 | 11/2004 | Searby et al. | | |
| 6,819,551 B2 | 11/2004 | Chen et al. | | |
| 6,836,412 B2 | 12/2004 | Kim et al. | | |
| 6,935,661 B1 * | 8/2005 | Farnsworth et al. | ......... | 292/162 |
| 7,054,144 B2 * | 5/2006 | Heistand et al. | ............ | 361/679 |

* cited by examiner

*Primary Examiner*—Jayprakash N Gandhi
(74) *Attorney, Agent, or Firm*—Morris, Manning & Martin LLP; Tim Tingkang Xia, Esq.

(57) ABSTRACT

A computer enclosure includes a chassis (30), a cover (20) attached to the chassis (30) and a lock system (40) for securing the cover (20) on the chassis (30). The lock system (40) includes a spring (46) and a locking piece (42) pivotally attached to the cover (20). The locking piece (42) has a driving portion (426) at one end and at least one hook (424) at the other end. The spring (46) urges the hook (424) to engage with the chassis (30). When the driving portion (426) is pushed, the hook (424) is levered and disengaged from the chassis (30).

19 Claims, 8 Drawing Sheets

COMPUTER ENCLOSURE

BACKGROUND OF THE INVENTION

1. Field of the Invention

The present invention relates to a computer enclosure, and more particularly to a mounting mechanism which facilitates assembly of a computer cover to a computer enclosure.

2. Background of the Invention

In order to mount electronic components into computer conveniently, an opening is usually defined in a computer enclosure. The electronic components such as hard disk, CD-ROM, get through the opening and were secured therein. Then, a side plate is mounted on the computer enclosure to cover the opening.

Previously, the side plate of the computer is typically secured to the computer enclosure by retaining screws. In the process to mount or demount components in the computer enclosure, it is necessary to remove the individual retaining screw firstly. However, there are a plurality of screws fastened in the computer enclosure. It is boring to manipulate the screws frequently. Furthermore, the tiny screw will be easily lost or dropped into other electronics of the computer. If not removed carefully, the presence of a screw can cause electronic or physical damage to the computer electronics.

Accordingly, what is needed is a mounting mechanism which facilitates assembly of a computer cover to a computer enclosure.

SUMMARY OF THE INVENTION

A computer enclosure includes a chassis, a cover attached to the chassis and a lock system for securing the cover on the chassis. The lock system includes a spring and a locking piece pivotally attached to the cover. The locking piece has a driving portion at one end and at least one hook at the other end. The spring urges the hook to engage with the chassis. When the driving portion is pushed, the hook is levered and disengaged from the chassis.

Other objects, advantages and novel features of the present invention will be drawn from the following detailed description of preferred embodiments of the present invention with the attached drawings, in which:

DETAILED DESCRIPTION OF THE INVENTION

Figure 1:
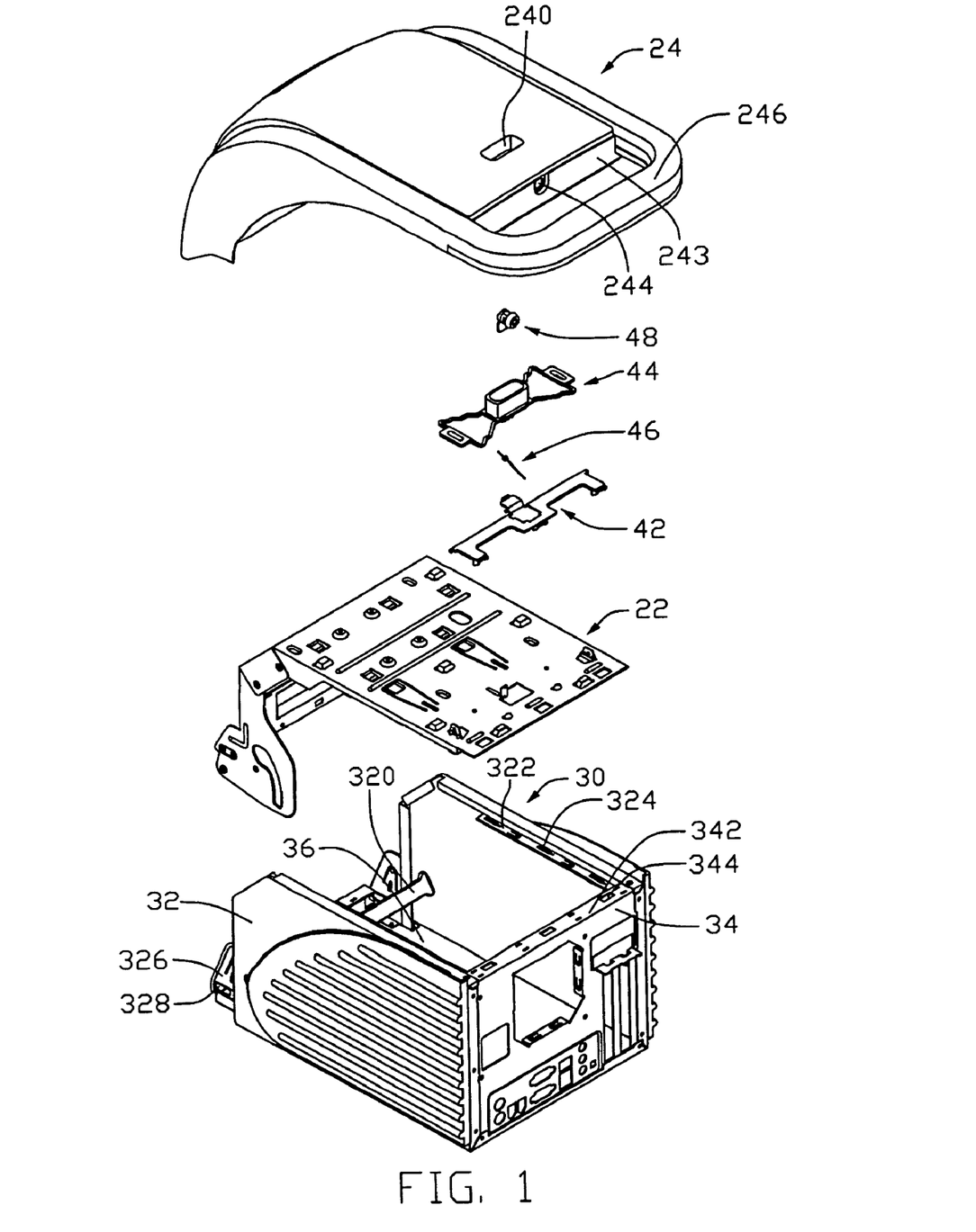
FIG. 1 is an exploded, isometric view of a mounting mechanism in accordance with a preferred embodiment of the present invention.
Figure 2:
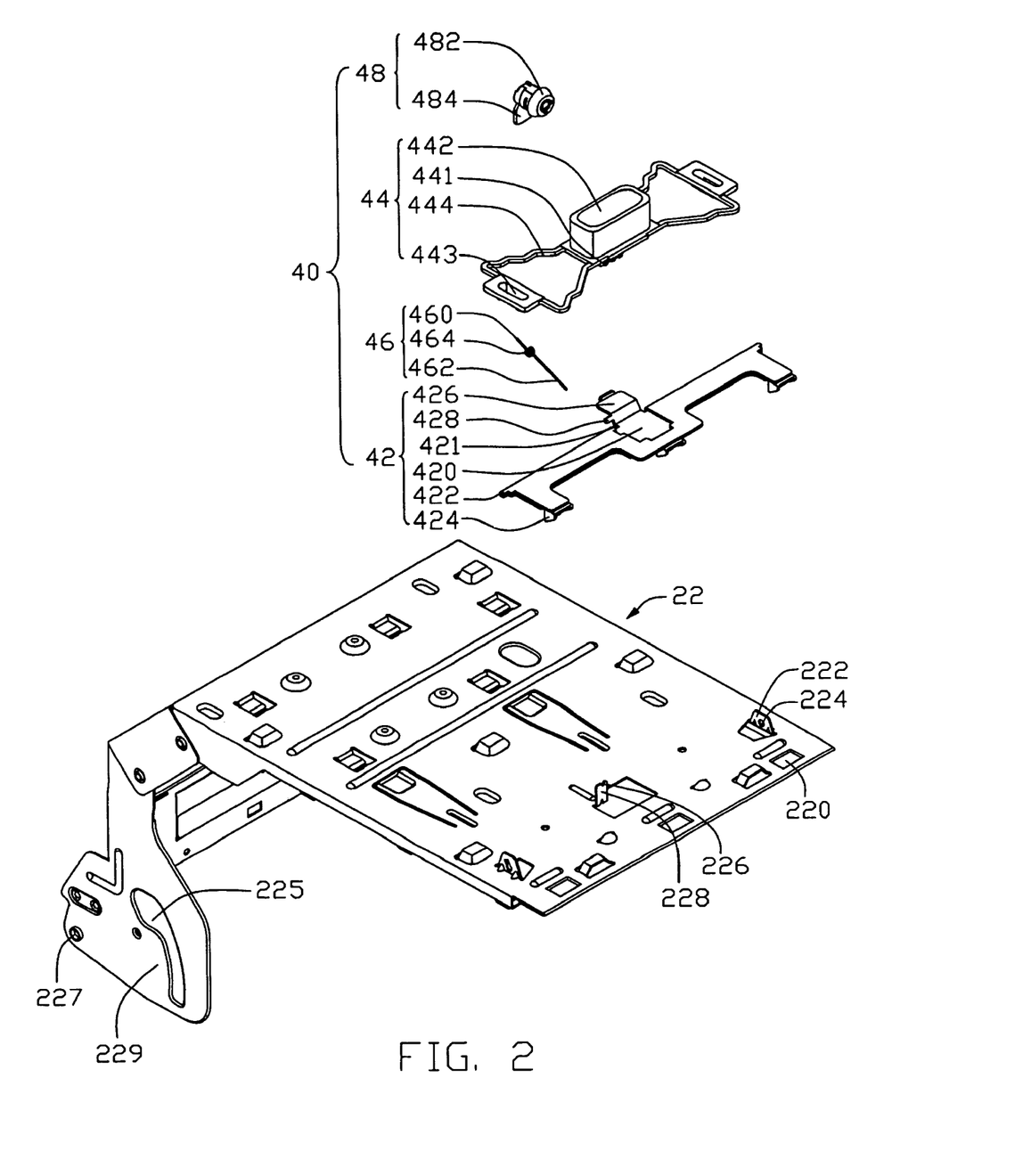
FIG. 2 is an enlarged, exploded view of a lock assembly and a base shown in FIG. 1.
Figure 4:
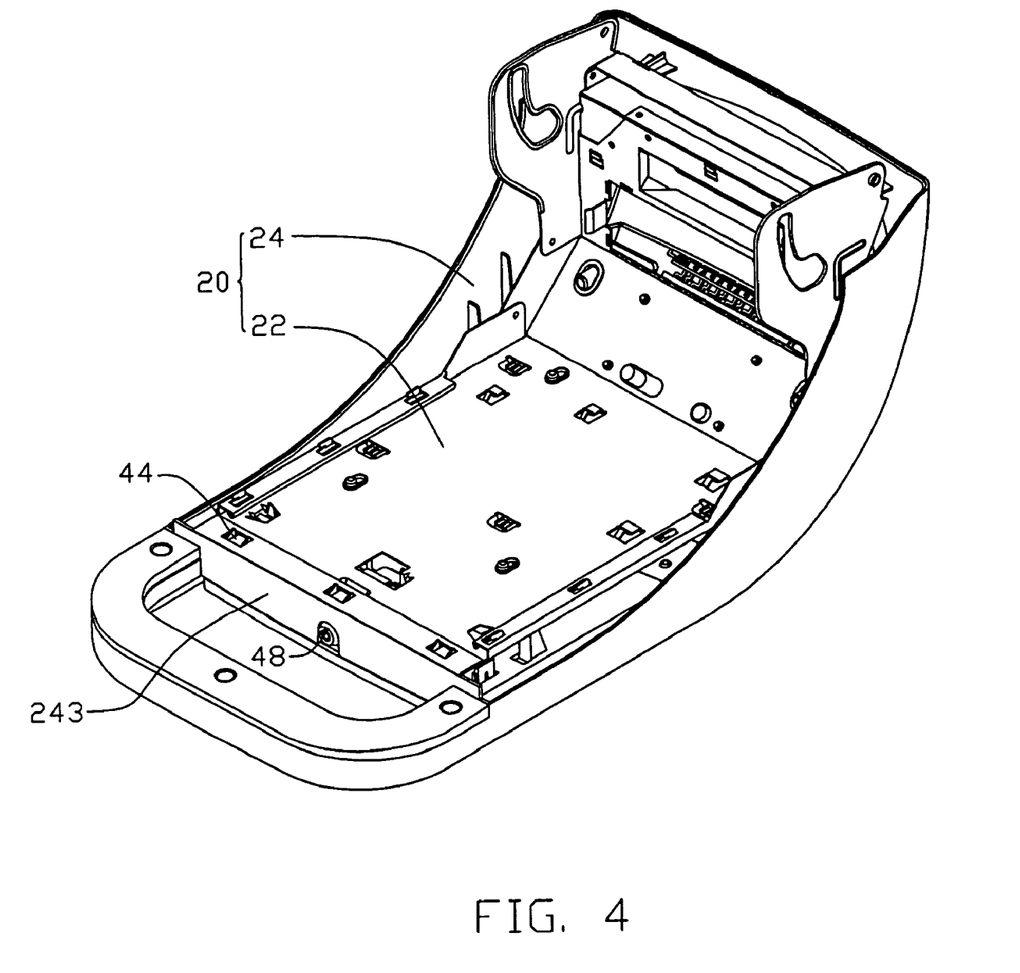
FIG. 4 is an assembled view of FIG. 3.

Referring to FIGS. 1, 2 and 4, a mounting mechanism for an enclosure of an electronic device like a computer in accordance with the preferred embodiment of the present invention includes a cover 20, a chassis 30 and a lock system 40 for securing the cover 20 to the chassis 30.

The chassis 30 is used to receive electronic components such as hard disk, CD-ROM, motherboard, power supply and so on. The chassis 30 includes a bottom wall 36, a pair of side walls 32 extending from opposite sides of the bottom wall 36, and a rear plate 34 between the side walls 32. A pair of flanges 322 each with three securing slots 324 defined thereon is bent inwardly from the top edges of the side plates 32 respectively. A flange 342 with three apertures 344 defined is bent inwardly from a top edge of the rear plate 34. A support member 326 extends outwardly from the front portion of each side wall 32. A slide rail 328 is formed in the outside of the support member 326. A bar 320 for preventing over-moving of the cover 20 is disposed between the two side plates 32 and protruded through the two side walls 32 respectively.

Figure 3:
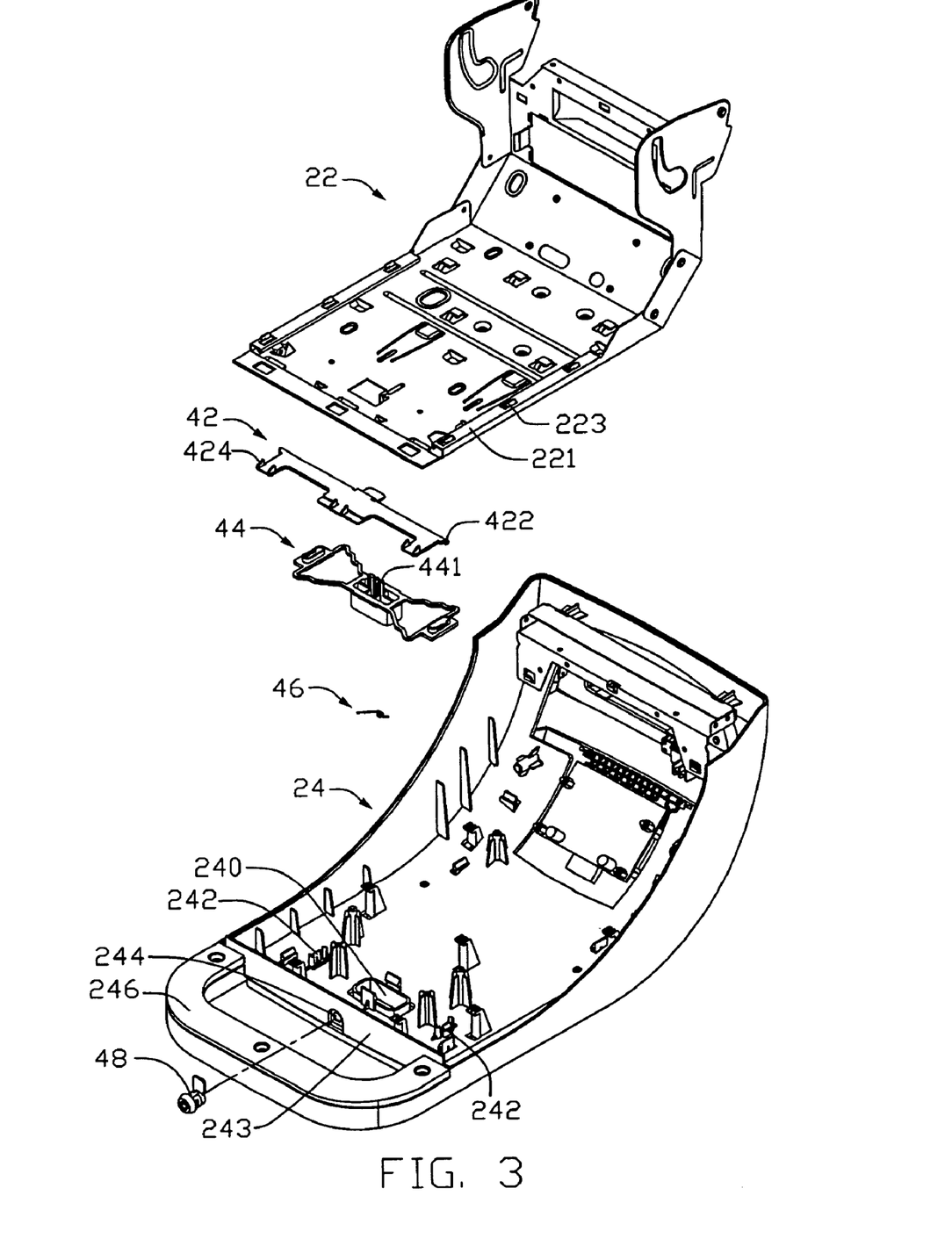
FIG. 3 is an exploded view of a cover and the components shown in FIG. 2, but viewed from another aspect.

Referring to FIGS. 2 and 3 simultaneously, the cover 20 comprises a bracket 22 and a curved panel 24 covering on the bracket 22. Three openings 220 are defined along one edge of the bracket 22 in correspondence with the apertures 344 in the chassis 30. A pair of flanges 221 are formed inwardly at the lower side of the base 22 respectively. Three hooks 223 protrude from each flange 221 in correspondence with the securing slots 324. A pair of tabs 222 extends upwardly from the bracket 22 adjacent to the openings 220. A hole 224 is defined at the center of each tab 222. A receiving piece 228 having a receiving notch 226 defined is stamped upwardly between the two tabs 222. The bracket 22 further includes a pair of side plates 229. A post 227 corresponding to the slide rail 328 of the chassis 30 is formed at a front corner of each side plate 229. An arcuate slot 225 for receiving the distal end of the bar 320 is defined in the side plate 229 at a back position relative to the post 227.

A receiving hole 244 is defined at a back flange 243 of the curved panel 24. A handle 246 for pulling the cover 20 extends from the panel 24. A rectangular through opening 240 is defined in a rear portion of the panel 24. A pair of securing barbs 242 are protruded at two sides of the opening 240 respectively.

The lock system 40 includes a substantially E-shaped locking piece 42, a button 44, a spring 46 and a lock 48. Three pairs of hooks 424 corresponding to the openings 220 in the bracket 22 are protruded from the underside of the locking piece 42. A pair of tabs 422 is formed at opposite ends of the locking piece 42 respectively. A recession 420 is defined in the middle of the locking piece 42. An L-shaped driving portion 426 extends outwardly from one edge of the locking piece 42 at a middle thereof. The driving portion 426 is formed at the same side with the tab 422. A second receiving notch 421 is defined at a joint of the driving portion 426 and the locking piece 42. A short post 428 is protruded from one side of the driving portion 426 over the receiving notch 421.

The button 44 includes a pressing body 442 and a pair of resilient arms 444 extending outwardly from opposite sides of the pressing body 442. A securing hole 443 is defined in an end portion of each resilient arm 444 in correspondence with the securing barb 242 in the panel 24. A protuberance 441 matched with the driving portion 426 is protruded from the bottom of the pressing body 442.

The spring 46 includes a short leg 460, a long leg 462 and a coil portion 464.

The lock 48 includes a main body 482 and a lock tab 484 vertically protruding from a bottom of the main body 482.

Referring to FIGS. 1-5, in assembly, the pressing body 442 of the button 44 is received in the through hole 240 of the curved panel 24. The securing barbs 242 of the panel 24 are engaged in the securing holes 443. Thereby, the button 14 is attached to the panel 24. The hooks 424 of the locking piece 42 are extended through the openings 220 in the bracket 22. The tabs 422 of the locking piece 42 are pivotally engaged in the holes 224 of the tabs 222 respectively. Thereby, the locking piece 42 is attached to the bracket 22. The short leg 460 and the long leg 462 of the spring 46 are respectively received in the first receiving notch 226 of the bracket 22 and the second receiving notch 421 of the locking piece 42, and the coil portion 464 is attached to the post 428. The main body 482 of the lock 48 is received in the receiving hole 244 of the panel 24. Then, the bracket 22 is attached to the panel 24 to form an integrated top cover 20, and the lock system 40 is disposed therebetween.

The post 227 of the bracket 22 is pivotally received in the slide rail 328 of the support member 326. A distal end of the bar 320 is inserted in the slot 225 of the bracket 22. Then the front portion of the cover 20 is pivotally attached to the chassis 30.

Figure 5:
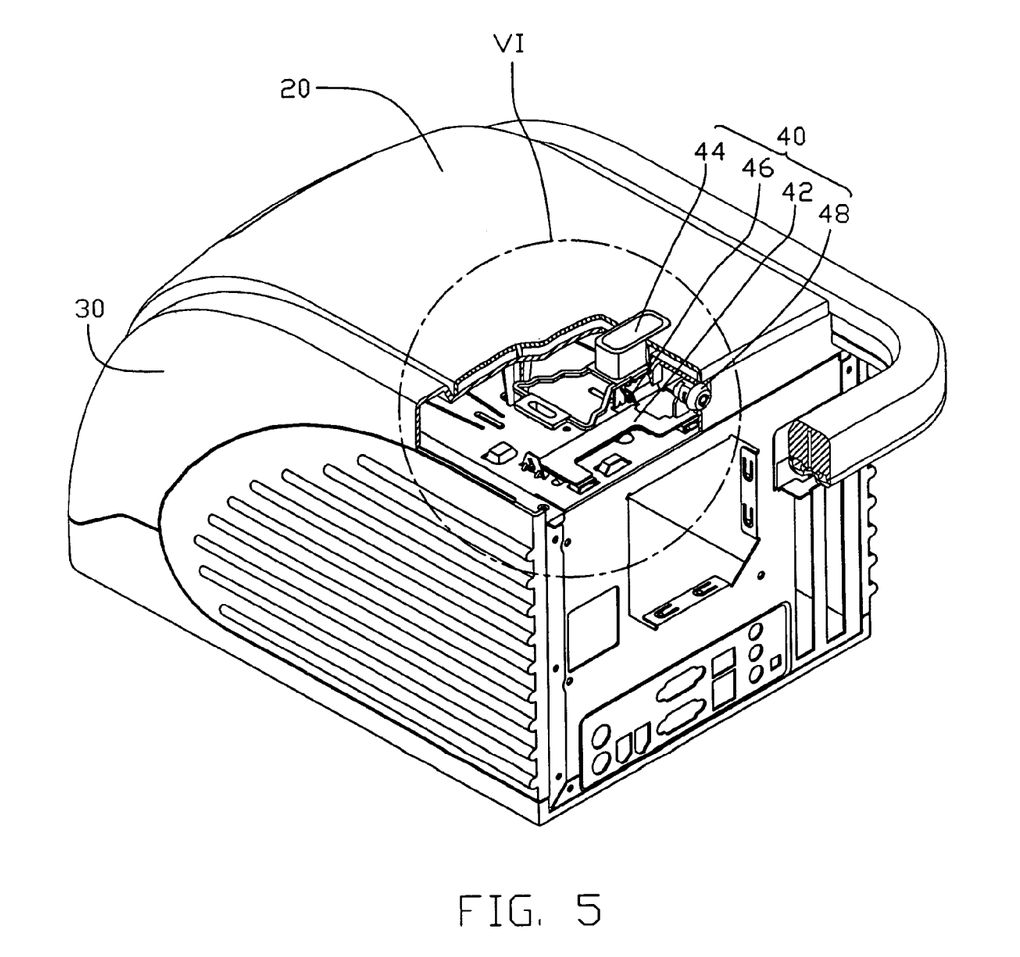
FIG. 5 is an assembled, partially cutaway view of the mounting mechanism shown in FIG. 1, the cover being in a closed position.
Figure 6:
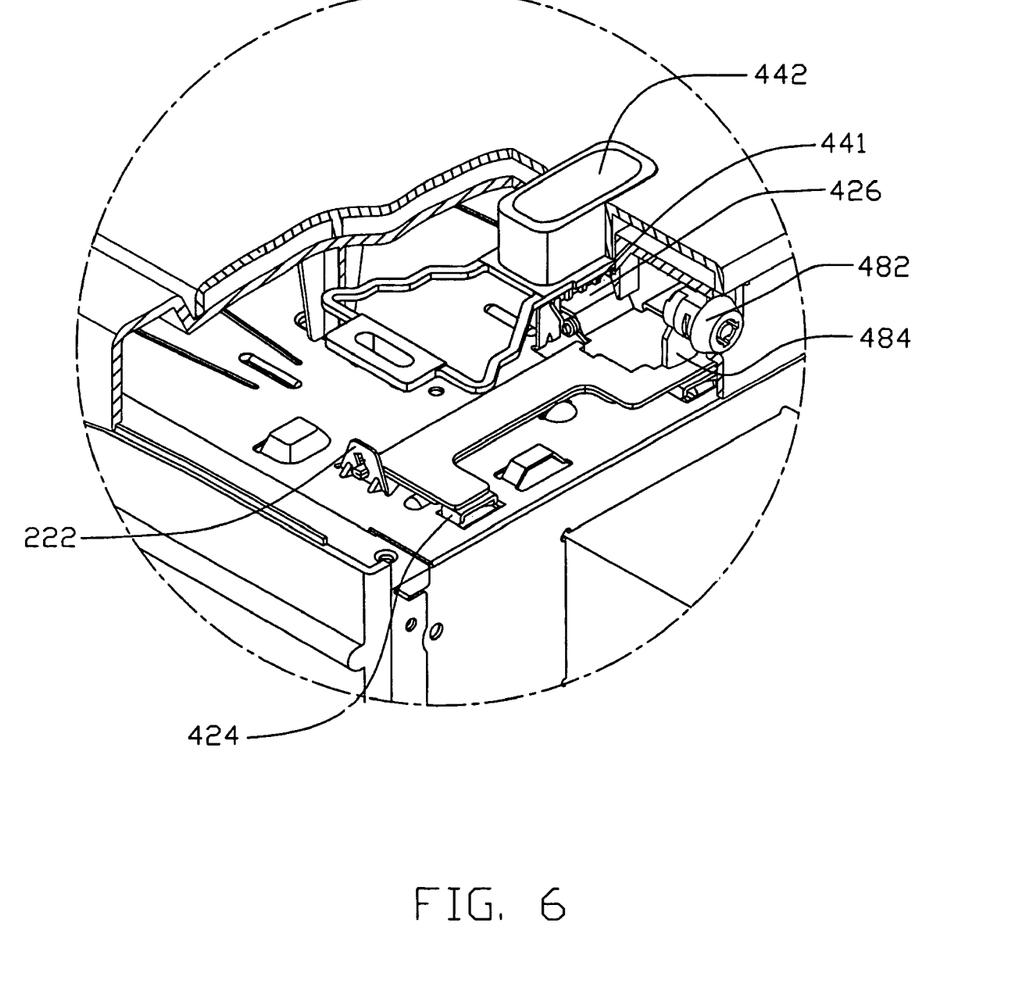
FIG. 6 is a partially enlarged view of portion VI in FIG. 5.

Referring to FIG. 5 and FIG. 6, the cover 20 is in a closed state. The hooks 424 of the locking piece 42 are respectively engaged into the apertures 344 of the chassis 30 (see FIG. 1), and other three hooks 223 (see FIG. 3) are respectively engaged into the securing slots 324 (see FIG. 1) of the chassis 30. The protuberance 441 of the button 44 touches the driving portion 426 of the securing piece 42. The lock tab 484 of the lock 48 presses on the locking piece 42 to prevent the hooks 424 disengaging from the aperture 344. The cover 20 is thus secured to the chassis. In the closed state, the spring 46 is in an initial state.

Figure 7:
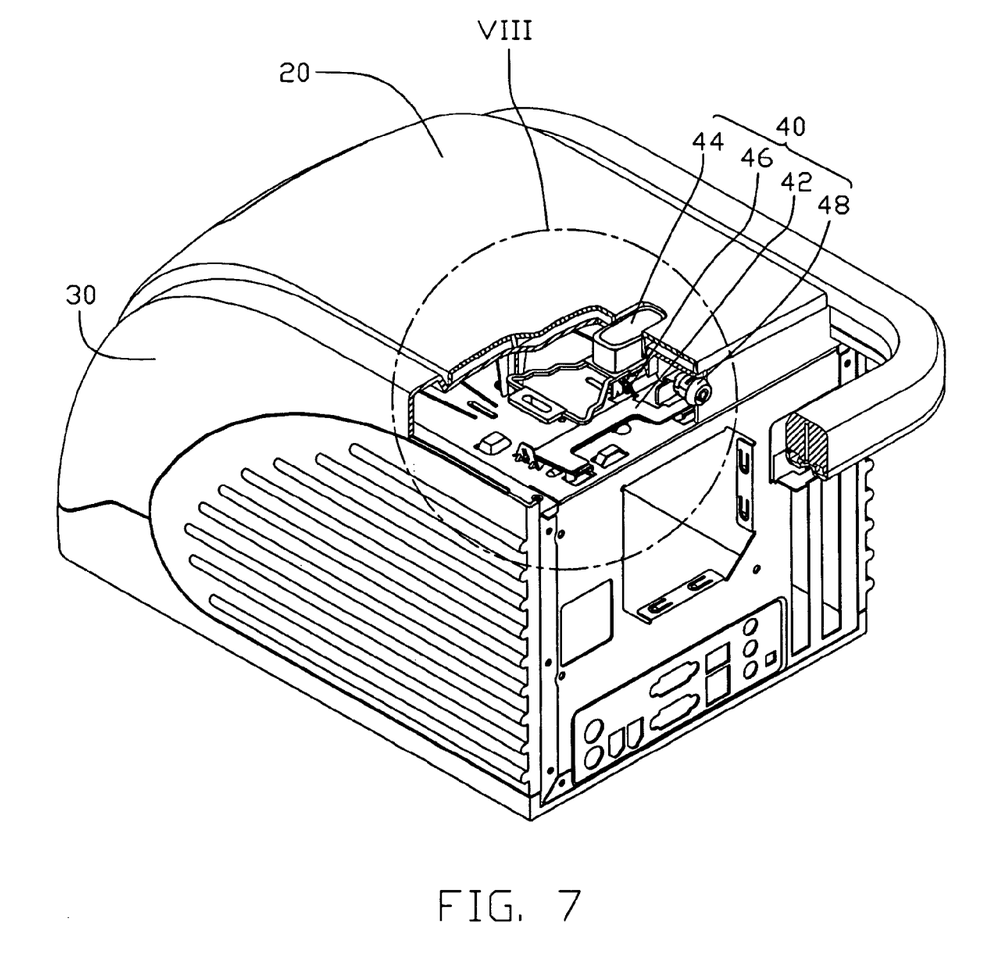
FIG. 7 is an assembled, partially cutaway view of FIG. 1, the cover being in an opened position.
Figure 8:
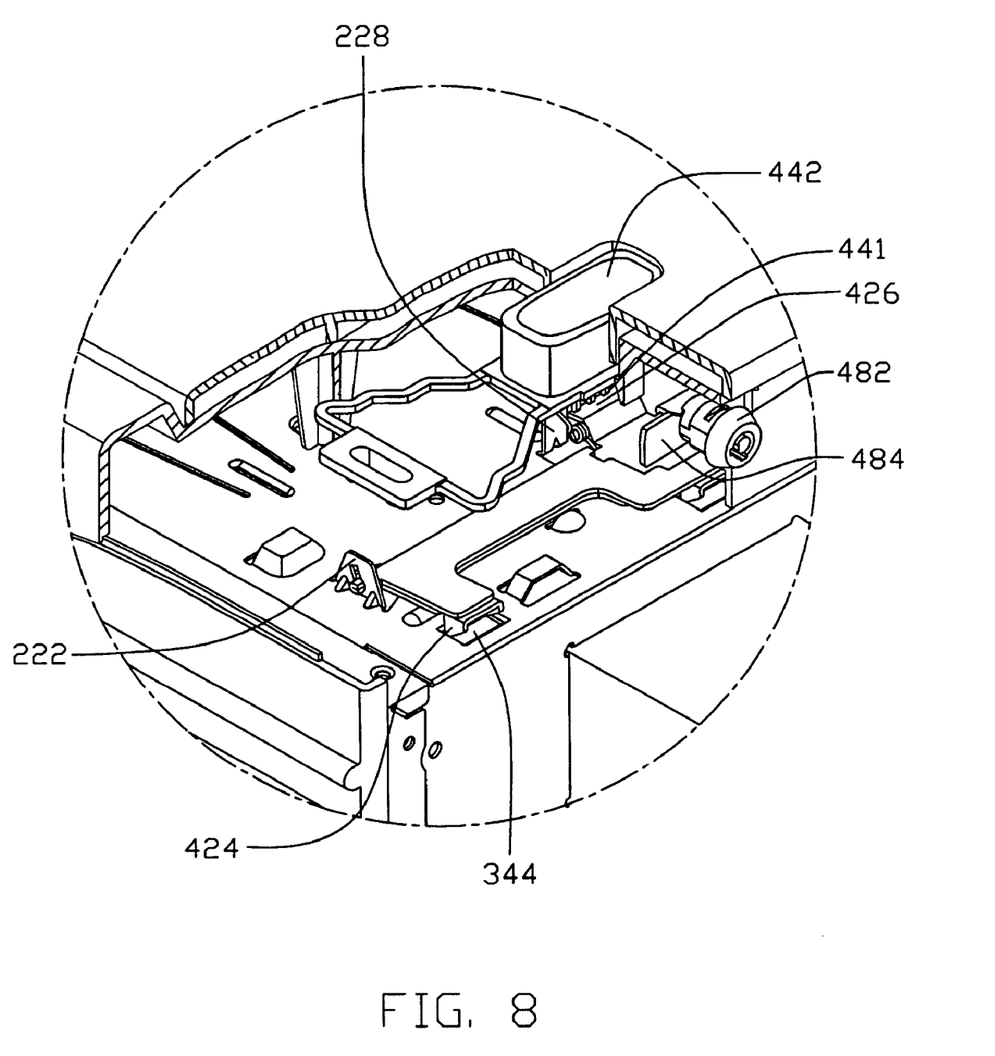
FIG. 8 is an partially enlarged view of portion VIII in FIG. 7.

Referring to FIG. 7 and FIG. 8, when in use, the lock tab 484 is rotated about 90 degree, and the locking piece 42 is free. When the pressing body 442 of the button 44 is pushed, the driving portion 426 is pressed downwardly. The locking piece 42 is forced to pivot about the tabs 222 of the bracket 22. The hooks 424 of the locking piece 42 is drawn from the apertures 344 of the chassis 30. At this time, the spring 46 is twisted to be tensioned. It is understandable that when the button 44 is released at this moment, the spring 46 rebounds to urge the locking piece 42 to engage with the chassis 30 again.

Pushing the handle 246 outwardly, the cover 20 is pivotally moved relative to the support members 326 of the chassis 30 to an open position for accessing and servicing the components in the computer enclosure.

When in closed position, the hooks 424 and 223 are respectively engaged into the apertures 344 and the securing slots 324 of the chassis 30. The cover 20 is fastened both in horizontal and vertical direction. It is to be understood that the lock is not necessary.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A computer enclosure comprising:
a chassis;
a cover attached to the chassis, the cover comprising an opening and a pair of securing barbs extending from the cover; and
a lock system for securing the cover on the chassis, the lock system comprising a spring and a locking piece pivotally attached to the cover, the locking piece having a driving portion at one end and at least one hook at the other end, the spring urging the hook to engage with the chassis; and
a button comprising a pressing body received in the opening for pushing the driving portion of the locking piece and a pair of securing holes for the securing barbs engaging therein, whereby when the driving portion is pushed, the hook is levered and disengaged from the chassis.

2. The computer enclosure as claimed in claim 1, wherein at least an aperture is defined in the chassis for the hook engaging therein.

3. The computer enclosure as claimed in claim 2, wherein the cover comprises a bracket and a panel attached to the bracket, the opening and the securing barbs are formed on the panel, at least one opening is defined in the bracket corresponding to the aperture in the chassis, and the lock system is disposed between the bracket and the panel.

4. The computer enclosure as claimed in claim 3, wherein a handle extends from the panel.

5. The computer enclosure as claimed in claim 3, wherein a pair of tabs are protruded from the bracket, each with a pivotal hole defined for the locking piece pivoting about.

6. The computer enclosure as claimed in claim 1 further comprising a lock for preventing the locking piece being pivoted and the hook being disengaged from the chassis, the lock comprises a main body and a lock tab protruding from the main body for pressing on the locking piece, and a receiving hole is defined in the cover for the main body of the lock rotatably engaged therein.

7. The computer enclosure as claimed in claim 1, wherein the locking piece is E-shaped, the driving portion extends from a middle of the locking piece.

8. The computer enclosure as claimed in claim 7, wherein the spring comprises a short leg, a long leg, and a coil portion, a post protrudes from one side of the driving portion for the coil portion of the spring being attached thereto.

9. A computer enclosure comprising:
a chassis;
a cover pivotally attached to the chassis, the cover comprises a panel and a bracket, a pair of tabs protruded from the bracket, a pivotal hole defined in each tab; and
a lock system disposed between the panel and the bracket of the cover for securing the cover to the chassis, the lock system comprising a rotatable lock and a locking piece pivotally engaging with the pivotal holes of the tabs, the lock having a lock tab, the locking piece being abutted against by the lock tab to engage with the chassis, whereby when the lock is rotated, the locking piece is ready to be pivoted to disengage from the chassis.

10. The computer enclosure as claimed in claim 9, wherein the panel comprises a pair of securing barbs extending from the inside of the panel and a button for pivoting the locking piece, the button comprising a pair of resilient arms each with a securing hole defined for the securing barbs engaging therein.

11. The computer enclosure as claimed in claim 9, wherein the locking piece comprises an L-shaped driving portion at one end and at least one hook at the other end.

12. The computer enclosure as claimed in claim 11, wherein the lock system further comprises a spring for urging the locking piece to engage with the chassis.

13. An electronic device comprising:
a chassis partially enclosing said electronic device;
a cover movably attached to said chassis and entirely enclosing said electronic device in cooperation with said chassis, said cover movable between a first position where a side of said electronic device is covered by said cover, and a second position where said side of said electronic device is uncovered from said cover; and a lock system situated between said cover and said chassis and capable of retaining said cover in said first position and releasing said cover to allow said cover movable from said first position to said second position, said lock system having an operable button operatively exposable to an outside of said electronic device, and a locking piece capable of resiliently engaging with the chassis in said first position of said cover and capable of disengaging from said chassis along a first direction by means of movable operation of said button along second direction opposite to said first direction.

14. The electronic device as claimed in claim 13, wherein said locking piece is pivotally attached to said cover so as to move oppositely to said button for disengagement thereof from said chassis.

15. The electronic device as claimed in claim 13, wherein a spring is attached to said locking piece for resilience thereof, said spring has a pair of legs supported by said cover and said locking piece respectively.

16. The electronic device as claimed in claim 14, wherein a pair of tabs protrudes from said cover, and each of said pair of tabs has a pivotal hole defined therein for pivoting of said locking piece.

17. The electronic device as claimed in claim 16, wherein said locking piece has a pair of opposite tabs received in said pivotal holes of said protruding tabs of said cover respectively.

18. The electronic device as claimed in claim 13, wherein said cover comprises a pair of securing barbs extending from said cover, said button comprises a pressing body for pushing said locking piece and a pair of securing holes for said securing barbs engaged therein.

19. The electronic device as claimed in claim 18, wherein said button further comprises a pair of resilient arms extending outwardly from opposite sides of said pressing body, said securing holes are defined in said resilient arms respectively.

* * * * *